(12) United States Patent
Miles et al.

(10) Patent No.: US 11,554,461 B1
(45) Date of Patent: Jan. 17, 2023

(54) ARTICULATING APPARATUS OF A WATERJET SYSTEM AND RELATED TECHNOLOGY

(71) Applicant: Omax Corporation, Kent, WA (US)

(72) Inventors: Peter J. Miles, Kent, WA (US); Axel H. Henning, Black Diamond, WA (US)

(73) Assignee: OMAX Corporation, Kent, WA (US)

( * ) Notice: Subject to any disclaimer, the term of this patent is extended or adjusted under 35 U.S.C. 154(b) by 891 days.

(21) Appl. No.: 16/275,122

(22) Filed: Feb. 13, 2019

Related U.S. Application Data (60) Provisional application No. 62/630,135, filed on Feb. 13, 2018.

(51) Int. Cl.
*B24C 1/04* (2006.01)
*B24C 5/02* (2006.01)
(Continued)

(52) U.S. Cl.
CPC .......... *B24C 1/045* (2013.01); *B24B 27/0038* (2013.01); *B24B 41/02* (2013.01);
(Continued)

(58) Field of Classification Search
CPC ....... B25J 9/106; B25J 5/02; B25J 5/04; B25J 5/06; B25J 9/02; B25J 9/04; B25J 9/06;
(Continued)

(56) References Cited

U.S. PATENT DOCUMENTS

| 433,022 A | 7/1890 | Noyes |
| 1,544,519 A | 6/1925 | McKinley et al. |

(Continued)

FOREIGN PATENT DOCUMENTS

| CN | 101811287 A | 8/2010 |
| CN | 102507171 A | 6/2012 |

(Continued)

OTHER PUBLICATIONS

Omron Industrial Automation. "Servomotors/Servo Drives" (2016). Found at https://web.archive.org/web/20160801203451/https://www.ia.omron.com/support/guide/14/introduction.html (Year: 2016).*

(Continued)

*Primary Examiner* — Eileen P Morgan
(74) *Attorney, Agent, or Firm* — Perkins Coie LLP (57) ABSTRACT

A waterjet system in accordance with at least some embodiments includes a carriage, a motion assembly configured to move the carriage horizontally relative to a workpiece, and a cutting head carried by the carriage. The waterjet system can also include a kinematic chain through which the cutting head is operably connected to the carriage. The kinematic chain can include first, second, and third joints rotatably adjustable about different first, second, and third axes, respectively. The carriage and the first and second joints can be configured to move the cutting head along a path relative to the workpiece while the cutting head directs a jet toward the workpiece to form a product. The third joint can be configured to shift a kinematic singularity away from the path to reduce or eliminate delay and corresponding reduced cutting accuracy associated with approaching the kinematic singularity.

10 Claims, 6 Drawing Sheets

(51) Int. Cl.
  *B24C 3/06* (2006.01)
  *B24B 41/02* (2006.01)
  *B25J 5/04* (2006.01)
  *B25J 9/02* (2006.01)
  *B25J 9/04* (2006.01)
  *B25J 9/06* (2006.01)
  *B24B 27/00* (2006.01)
  *B25J 9/10* (2006.01)

(52) U.S. Cl.
  CPC .......... *B24C 3/06* (2013.01); *B24C 5/02* (2013.01); *B25J 5/04* (2013.01); *B25J 9/02* (2013.01); *B25J 9/04* (2013.01); *B25J 9/06* (2013.01); *B25J 9/106* (2013.01)

(58) Field of Classification Search
  CPC .... B25J 9/10; B24B 27/0015; B24B 27/0038; B24B 41/02; B24C 1/04; B24C 1/045; B24C 3/06; B24C 5/02; B24C 7/0007
  See application file for complete search history.

(56) References Cited

U.S. PATENT DOCUMENTS

| | | |
|---|---|---|
| 1,554,406 A | 9/1925 | Coberty |
| 1,684,431 A | 9/1928 | Behee, Jr. |
| 1,937,408 A | 11/1933 | Johnson |
| 2,007,180 A | 7/1935 | Doran et al. |
| 2,009,932 A | 7/1935 | Klotzman |
| 2,220,002 A | 10/1940 | Rollman et al. |
| 2,308,347 A | 1/1943 | Asselin |
| 2,359,352 A | 10/1944 | Buckman et al. |
| 2,376,287 A | 5/1945 | Sorrentino |
| 2,403,751 A | 7/1946 | Palmer |
| 2,456,041 A | 12/1948 | Barker |
| 2,544,414 A | 3/1951 | Bridgman et al. |
| 2,558,035 A | 6/1951 | Bridgman |
| 2,819,835 A | 1/1958 | Newhall |
| 2,822,789 A | 2/1958 | Philips et al. |
| 2,951,369 A | 9/1960 | Newhall |
| 2,952,071 A | 9/1960 | Burt |
| 2,985,050 A | 5/1961 | Schwacha |
| 3,081,990 A | 3/1963 | Bromley |
| 3,086,749 A | 4/1963 | Frye |
| 3,088,854 A | 5/1963 | Spies, Jr. |
| 3,095,900 A | 7/1963 | Newhall |
| 3,106,169 A | 10/1963 | Prosser et al. |
| 3,137,978 A | 6/1964 | Incantalupo |
| 3,148,528 A | 9/1964 | Reynolds |
| 3,174,364 A | 3/1965 | Sims |
| 3,270,464 A | 9/1966 | Bowling, Jr. et al. |
| 3,296,855 A | 1/1967 | Newhall |
| 3,323,809 A | 6/1967 | Brookfield |
| 3,343,794 A | 9/1967 | Voitsethovsky |
| 3,424,357 A | 1/1969 | Curtze et al. |
| 3,449,742 A | 6/1969 | Stapleton |
| 3,452,412 A | 7/1969 | Allman, Jr. et al. |
| 3,460,013 A | 8/1969 | Gaylor |
| 3,507,740 A | 4/1970 | Gasparai |
| 3,515,860 A | 6/1970 | Fitzgerald, Jr. |
| 3,519,998 A | 7/1970 | Barron |
| 3,521,853 A | 7/1970 | Gillis, Jr. et al. |
| 3,530,273 A | 9/1970 | Bollinger et al. |
| 3,543,444 A | 12/1970 | Mehta |
| 3,548,170 A | 12/1970 | Bruce et al. |
| 3,548,172 A | 12/1970 | Centner et al. |
| 3,564,971 A | 2/1971 | Wagner et al. |
| 3,593,459 A | 7/1971 | Kulischenko |
| 3,668,498 A | 6/1972 | Austin, Jr. |
| 3,705,693 A | 12/1972 | Franz |
| 3,708,936 A | 1/1973 | Rogers |
| 3,725,651 A | 4/1973 | Cutler |
| 3,746,256 A | 7/1973 | Hall et al. |
| 3,750,961 A | 8/1973 | Franz |
| 3,756,106 A | 9/1973 | Chadwick et al. |
| 3,765,661 A | 10/1973 | Omura |
| 3,769,753 A | 11/1973 | Fleischer |
| 3,785,707 A | 1/1974 | Mitsuoka |
| 3,789,741 A | 2/1974 | Hallberg |
| 3,851,899 A | 12/1974 | Franz |
| 3,870,941 A | 3/1975 | Ikenga et al. |
| 3,918,331 A | 11/1975 | Svanstrom |
| 3,932,961 A | 1/1976 | Pagella et al. |
| 4,006,890 A | 2/1976 | Vainer et al. |
| 3,997,111 A | 12/1976 | Thomas et al. |
| 3,999,384 A | 12/1976 | Mohaupt |
| 4,009,860 A | 3/1977 | Lingnau |
| 4,026,322 A | 5/1977 | Thomas |
| 4,031,369 A | 6/1977 | Heaman et al. |
| 4,042,178 A | 8/1977 | Veltrup et al. |
| 4,048,918 A | 9/1977 | Peck |
| 4,050,001 A | 9/1977 | Kishi et al. |
| 4,066,944 A | 1/1978 | Leenhouts |
| 4,075,789 A | 2/1978 | Dremann |
| 4,078,727 A | 3/1978 | Lingnau |
| 4,081,200 A | 3/1978 | Cheung |
| 4,081,892 A | 4/1978 | Mercer |
| 4,084,083 A | 4/1978 | McNally et al. |
| 4,125,969 A | 11/1978 | Easton |
| 4,162,763 A | 7/1979 | Higgins |
| 4,164,183 A | 8/1979 | Peck |
| 4,192,343 A | 3/1980 | Grahac |
| 4,203,022 A | 5/1980 | Couch, Jr. et al. |
| 4,205,828 A | 6/1980 | Hooper et al. |
| 4,214,192 A | 7/1980 | Bromer et al. |
| 4,216,415 A | 8/1980 | Shimonou et al. |
| 4,216,906 A | 8/1980 | Olsen et al. |
| 4,216,911 A | 8/1980 | Huperz et al. |
| 4,237,913 A | 12/1980 | Maasberg |
| 4,246,838 A | 1/1981 | Pulver et al. |
| 4,253,610 A | 3/1981 | Larkin |
| 4,256,139 A | 3/1981 | Huperz et al. |
| 4,262,757 A | 4/1981 | Johnson, Jr. et al. |
| 4,272,017 A | 6/1981 | Franz |
| 4,277,229 A | 7/1981 | Pacht |
| 4,282,763 A | 8/1981 | Griebeler |
| 4,306,627 A | 12/1981 | Cheung et al. |
| 4,306,728 A | 12/1981 | Huperz et al. |
| 4,313,570 A | 2/1982 | Olsen |
| 4,326,937 A | 4/1982 | Neumeier et al. |
| 4,361,748 A | 11/1982 | Couch, Jr. |
| 4,371,001 A | 2/1983 | Olsen |
| 4,392,534 A | 7/1983 | Miida |
| 4,392,784 A | 7/1983 | Hanafi |
| 4,401,345 A | 8/1983 | Archibald |
| 4,404,507 A | 9/1983 | Dean et al. |
| 4,412,792 A | 11/1983 | LaBorde et al. |
| 4,415,867 A | 11/1983 | Rubin |
| 4,435,902 A | 3/1984 | Mercer et al. |
| 4,437,525 A | 3/1984 | O'Hanlon et al. |
| 4,447,178 A | 5/1984 | Esser |
| 4,456,132 A | 6/1984 | LaValle et al. |
| 4,456,440 A | 6/1984 | Korner |
| 4,456,863 A | 6/1984 | Matusek |
| 4,478,368 A | 10/1984 | Yie |
| 4,495,845 A | 1/1985 | Sherby |
| 4,524,544 A | 6/1985 | Habib |
| 4,534,427 A | 8/1985 | Wang et al. |
| 4,540,056 A | 9/1985 | O'Hanlon |
| 4,540,320 A | 9/1985 | Arnold |
| 4,545,157 A | 10/1985 | Saurwein |
| 4,555,758 A | 11/1985 | Inaba et al. |
| 4,555,872 A | 12/1985 | Yie |
| 4,557,245 A | 12/1985 | Bieri |
| 4,564,995 A | 1/1986 | Kase |
| 4,573,886 A | 3/1986 | Maasberg et al. |
| 4,574,825 A | 3/1986 | Haug |
| 4,578,748 A | 3/1986 | Abe et al. |
| 4,594,924 A | 6/1986 | Windisch |
| 4,598,380 A | 7/1986 | Holmes et al. |
| 4,600,985 A | 7/1986 | Nozawa et al. |
| 4,606,150 A | 8/1986 | Grimm |
| 4,614,128 A | 9/1986 | Fickler |
| 4,626,756 A | 12/1986 | Inaba et al. |

(56) References Cited

U.S. PATENT DOCUMENTS

| | | | |
|---|---|---|---|
| 4,634,353 A | 1/1987 | Huperz | |
| 4,644,460 A | 2/1987 | Kishi et al. | |
| 4,648,215 A | 3/1987 | Hashish et al. | |
| 4,651,601 A | 3/1987 | Sasaki | |
| 4,660,773 A | 4/1987 | O'Hanlon | |
| 4,665,944 A | 5/1987 | Wallace et al. | |
| 4,666,083 A | 5/1987 | Yie | |
| 4,669,783 A | 6/1987 | Kolle | |
| 4,674,239 A | 6/1987 | Jodoin | |
| 4,680,519 A | 7/1987 | Chand et al. | |
| 4,697,769 A | 10/1987 | Blackwelder et al. | |
| 4,715,538 A | 12/1987 | Lingnau | |
| 4,716,350 A | 12/1987 | Huang et al. | |
| 4,728,872 A | 3/1988 | Kishi et al. | |
| 4,738,174 A | 4/1988 | Bloomquist | |
| 4,741,680 A | 5/1988 | Broker et al. | |
| 4,761,595 A | 8/1988 | Goor | |
| 4,768,702 A | 9/1988 | Takahashi et al. | |
| 4,776,769 A | 10/1988 | Hilaris | |
| 4,785,027 A | 11/1988 | Brasington et al. | |
| 4,787,049 A | 11/1988 | Hirata et al. | |
| 4,798,094 A | 1/1989 | Newhall et al. | |
| 4,802,312 A | 2/1989 | Glaeser et al. | |
| 4,810,945 A | 3/1989 | Yoneda et al. | |
| 4,815,241 A | 3/1989 | Woodson | |
| 4,816,284 A | 3/1989 | Magee | |
| 4,817,342 A | 4/1989 | Martin et al. | |
| 4,817,874 A | 4/1989 | Jarzebowicz | |
| 4,818,194 A | 4/1989 | Saurwein | |
| 4,821,467 A | 4/1989 | Woodson et al. | |
| 4,822,218 A | 4/1989 | Satoh | |
| 4,823,550 A | 4/1989 | Decker | |
| 4,852,800 A | 8/1989 | Murdock | |
| 4,879,663 A | 11/1989 | Fuehrer | |
| 4,893,753 A | 1/1990 | Munoz et al. | |
| 4,899,602 A | 2/1990 | Fender | |
| 4,903,213 A | 2/1990 | Buhler et al. | |
| 4,907,371 A | 3/1990 | Shoda et al. | |
| 4,912,385 A | 3/1990 | Kawamura et al. | |
| 4,920,495 A | 4/1990 | Pilkington | |
| 4,934,111 A | 6/1990 | Hashish et al. | |
| 4,951,429 A | 8/1990 | Hashish et al. | |
| 4,955,164 A | 9/1990 | Hashish et al. | |
| 4,973,026 A | 11/1990 | Saurwein | |
| 4,987,356 A | 1/1991 | Yamada et al. | |
| 4,987,668 A | 1/1991 | Roesch | |
| 5,018,670 A | 5/1991 | Chalmers | |
| 5,037,276 A | 8/1991 | Tremoulet, Jr. | |
| 5,037,277 A | 8/1991 | Tan | |
| 5,051,555 A | 9/1991 | Porterfield et al. | |
| 5,052,089 A | 10/1991 | Gadaud et al. | |
| 5,084,791 A | 1/1992 | Thanos et al. | |
| 5,098,229 A | 3/1992 | Meier et al. | |
| 5,107,630 A | 4/1992 | Lodewijk | |
| 5,117,872 A | 6/1992 | Yie | |
| 5,126,645 A | 6/1992 | Yoshimi et al. | |
| 5,144,211 A | 9/1992 | Daggett et al. | |
| 5,154,643 A | 10/1992 | Catania et al. | |
| 5,162,016 A * | 11/1992 | Malloy | B24C 11/00 452/155 |
| 5,176,018 A | 1/1993 | Thompson | |
| 5,177,421 A | 1/1993 | Sasaki et al. | |
| 5,186,157 A | 2/1993 | Bieri | |
| 5,186,393 A | 2/1993 | Yie | |
| 5,199,642 A | 4/1993 | Rankin | |
| 5,201,150 A | 4/1993 | Kuboyama et al. | |
| 5,209,406 A | 5/1993 | Johnson | |
| 5,212,430 A | 5/1993 | Jartyn | |
| 5,214,972 A | 6/1993 | Larson et al. | |
| 5,226,799 A | 7/1993 | Raghavan et al. | |
| 5,232,155 A | 8/1993 | Chen | |
| 5,236,459 A | 8/1993 | Koch et al. | |
| 5,239,788 A | 8/1993 | Woodson | |
| 5,249,161 A | 9/1993 | Jones et al. | |
| 5,253,808 A | 10/1993 | Pacht | |
| 5,286,006 A | 2/1994 | Ogura | |
| 5,297,777 A | 3/1994 | Yie | |
| 5,315,222 A | 5/1994 | Kasagami et al. | |
| 5,320,289 A | 6/1994 | Hashish et al. | |
| 5,330,167 A | 7/1994 | Plumb | |
| 5,331,264 A | 7/1994 | Cheng et al. | |
| 5,335,459 A | 8/1994 | Dale | |
| 5,351,714 A | 10/1994 | Barnowski | |
| 5,372,540 A | 12/1994 | Burch et al. | |
| 5,380,159 A | 1/1995 | Olsen et al. | |
| 5,407,379 A | 4/1995 | Shank et al. | |
| 5,413,270 A | 5/1995 | Lechervy et al. | |
| 5,441,441 A | 8/1995 | Cook et al. | |
| 5,468,066 A | 11/1995 | Hammonds | |
| 5,469,768 A | 11/1995 | Schumacher | |
| 5,472,367 A | 12/1995 | Slocum et al. | |
| 5,475,196 A | 12/1995 | Lisec | |
| 5,481,260 A | 1/1996 | Buckler et al. | |
| 5,484,325 A | 1/1996 | Shank | |
| 5,505,653 A | 4/1996 | Nedo et al. | |
| 5,508,596 A | 4/1996 | Olsen | |
| 5,509,849 A | 4/1996 | Spears, Jr. | |
| 5,524,821 A | 6/1996 | Yie et al. | |
| 5,557,154 A | 9/1996 | Erhart | |
| 5,564,469 A | 10/1996 | Tremoulet, Jr. et al. | |
| 5,616,067 A | 4/1997 | Goenka | |
| 5,636,789 A | 6/1997 | Shook | |
| 5,637,030 A | 6/1997 | Chopra et al. | |
| 5,643,058 A | 7/1997 | Erichsen et al. | |
| 5,649,694 A | 7/1997 | Buck | |
| 5,679,058 A | 10/1997 | Rhoades | |
| 5,682,309 A | 10/1997 | Bartusiak et al. | |
| 5,704,824 A | 1/1998 | Hashish et al. | |
| 5,719,480 A | 2/1998 | Bock et al. | |
| 5,722,688 A | 3/1998 | Garcia | |
| 5,727,773 A | 3/1998 | Dunnigan | |
| 5,730,358 A | 3/1998 | Raghavan et al. | |
| 5,730,635 A | 3/1998 | De Haas et al. | |
| 5,740,081 A | 4/1998 | Suzuki | |
| 5,759,086 A | 6/1998 | Klingel | |
| 5,778,713 A | 7/1998 | Butler et al. | |
| 5,782,673 A | 7/1998 | Warehime | |
| 5,799,688 A | 9/1998 | Yie | |
| 5,800,231 A | 9/1998 | De Haas et al. | |
| 5,800,246 A | 9/1998 | Tomioka | |
| 5,806,390 A | 9/1998 | Pomerleau et al. | |
| 5,831,403 A | 11/1998 | Kanki et al. | |
| 5,848,880 A | 12/1998 | Helmig | |
| 5,854,744 A | 12/1998 | Zeng et al. | |
| 5,865,576 A | 2/1999 | Arai et al. | |
| 5,876,267 A | 3/1999 | Kanda | |
| 5,892,345 A | 4/1999 | Olsen | |
| 5,904,297 A | 5/1999 | Kendrick, Jr. et al. | |
| 5,908,349 A | 6/1999 | Warehime | |
| 5,924,853 A | 7/1999 | Pacht | |
| 5,927,329 A | 7/1999 | Yie | |
| 5,970,996 A | 10/1999 | Markey et al. | |
| 5,975,429 A | 11/1999 | Jezek | |
| 5,986,425 A | 11/1999 | Onishi et al. | |
| 6,077,152 A | 6/2000 | Warehime | |
| 6,083,001 A | 7/2000 | Deardon et al. | |
| 6,098,677 A | 8/2000 | Wegman et al. | |
| 6,099,388 A | 8/2000 | Fritsch et al. | |
| 6,120,351 A | 9/2000 | Zeng | |
| 6,121,744 A | 9/2000 | Hoda et al. | |
| 6,126,524 A | 10/2000 | Shepherd | |
| 6,155,245 A | 12/2000 | Zanzuri | |
| 6,168,503 B1 | 1/2001 | Pao et al. | |
| 6,201,207 B1 | 3/2001 | Maruyama et al. | |
| 6,220,529 B1 | 4/2001 | Xu | |
| 6,222,155 B1 | 4/2001 | Blackmon et al. | |
| 6,227,087 B1 | 5/2001 | Thorsen et al. | |
| 6,243,625 B1 | 6/2001 | Wyatt et al. | |
| 6,244,927 B1 | 6/2001 | Zeng | |
| 6,247,422 B1 | 6/2001 | Murray, III | |
| 6,276,993 B1 | 8/2001 | Miller | |
| 6,280,302 B1 | 8/2001 | Hashish et al. | |
| 6,283,832 B1 | 9/2001 | Shepherd | |
| 6,283,833 B1 | 9/2001 | Pao et al. | |

(56) References Cited

U.S. PATENT DOCUMENTS

| | | |
|---|---|---|
| 6,299,510 B1 | 10/2001 | Massenburg |
| 6,328,638 B1 | 12/2001 | Hopkins et al. |
| 6,333,487 B1 | 12/2001 | Maruyama |
| 6,361,416 B1 | 3/2002 | Hopkins et al. |
| 6,379,214 B1 | 4/2002 | Stewart et al. |
| 6,415,820 B1 | 7/2002 | Glut, Jr. |
| 6,425,804 B1 | 7/2002 | Pettit et al. |
| 6,425,805 B1 | 7/2002 | Massa et al. |
| 6,430,787 B1 | 8/2002 | Becan et al. |
| 6,431,465 B1 | 8/2002 | Yie |
| 6,494,240 B1 | 12/2002 | Brisson |
| 6,511,368 B1 | 1/2003 | Halley |
| D470,566 S | 2/2003 | Sciulli et al. |
| 6,533,640 B1 | 3/2003 | Nopwaskey et al. |
| 6,533,643 B1 | 3/2003 | Feng |
| 6,540,586 B2 | 4/2003 | Sciulli |
| 6,588,724 B2 | 7/2003 | Yie |
| 6,616,372 B2 | 9/2003 | Seroka et al. |
| 6,619,570 B1 | 9/2003 | Ericksen et al. |
| 6,676,039 B2 | 1/2004 | Lindsey et al. |
| 6,684,133 B2 | 1/2004 | Frye-Hammelmann et al. |
| 6,705,921 B1 | 3/2004 | Shepherd |
| 6,752,685 B2 | 6/2004 | Ulrich et al. |
| 6,766,216 B2 | 7/2004 | Erichsen et al. |
| 6,802,541 B2 | 10/2004 | Hopinks |
| 6,819,974 B1 | 11/2004 | Coleman et al. |
| 6,845,295 B2 | 1/2005 | Cheng et al. |
| 6,852,002 B2 | 2/2005 | Stewart et al. |
| 6,870,346 B2 | 3/2005 | Davidov |
| 6,879,415 B2 | 4/2005 | Kurosawa |
| 6,905,396 B1 * | 6/2005 | Miller .................. C23C 4/02 451/75 |
| 6,922,605 B1 | 7/2005 | Olsen |
| 6,959,908 B2 | 11/2005 | Isbitsky |
| 7,033,256 B2 | 4/2006 | Miller |
| 7,035,708 B1 | 4/2006 | Olsen |
| 7,040,959 B1 | 5/2006 | Panuska et al. |
| 7,074,112 B2 | 7/2006 | Olsen |
| 7,083,124 B2 | 8/2006 | Bednorz et al. |
| 7,094,135 B2 | 8/2006 | Chisum et al. |
| 7,108,585 B2 | 9/2006 | Dorfman et al. |
| 7,162,943 B1 | 1/2007 | Reitmeyer et al. |
| 7,207,868 B2 | 4/2007 | Takehara et al. |
| 7,216,003 B2 | 5/2007 | Faulkner et al. |
| 7,357,697 B2 | 4/2008 | Massa et al. |
| 7,383,896 B2 | 6/2008 | Tibbits |
| 7,386,262 B2 | 6/2008 | Okamura et al. |
| 7,419,418 B2 | 9/2008 | Alberts et al. |
| 7,464,630 B2 | 12/2008 | Knaupp et al. |
| 7,485,027 B2 | 2/2009 | Miller |
| 7,489,984 B2 | 2/2009 | Jackman et al. |
| 7,537,019 B2 | 5/2009 | Ting et al. |
| 7,544,112 B1 | 6/2009 | Miller et al. |
| 7,560,892 B2 | 7/2009 | Shibasaki et al. |
| 7,585,201 B2 | 9/2009 | Kanai et al. |
| 7,594,614 B2 | 9/2009 | Vijay et al. |
| 7,703,363 B2 | 4/2010 | Knaupp et al. |
| 7,757,786 B2 | 7/2010 | Harder et al. |
| 7,815,490 B2 | 10/2010 | Liu |
| 7,832,481 B2 | 11/2010 | Martindale |
| 7,896,726 B1 | 3/2011 | Miller et al. |
| 7,917,017 B2 | 3/2011 | Kanamori |
| 7,938,713 B2 | 5/2011 | Trieb et al. |
| 8,024,068 B2 | 9/2011 | Gray |
| 8,123,591 B2 | 2/2012 | Olsen |
| 8,240,634 B2 | 8/2012 | Jarchau et al. |
| 8,308,525 B2 | 11/2012 | Hashish et al. |
| 8,342,912 B2 | 1/2013 | Funatsu et al. |
| 8,401,692 B2 | 3/2013 | Knaupp et al. |
| 8,423,172 B2 | 4/2013 | Erichsen et al. |
| 8,439,726 B2 | 5/2013 | Miller |
| 8,534,787 B2 | 9/2013 | Yate |
| 8,541,710 B2 | 9/2013 | Brandt et al. |
| 8,573,244 B2 | 11/2013 | Taylor |
| 8,593,086 B2 | 11/2013 | Hay et al. |
| 8,651,920 B2 | 2/2014 | Hashish |
| 8,676,372 B1 | 3/2014 | Bolin et al. |
| 8,768,516 B2 | 7/2014 | Diolaiti et al. |
| 8,821,213 B2 | 9/2014 | Liu et al. |
| 8,892,236 B2 | 11/2014 | Olsen |
| 8,904,912 B2 | 12/2014 | Raghavan et al. |
| 8,920,213 B2 | 12/2014 | Liu |
| 9,003,955 B1 | 4/2015 | Stang et al. |
| 9,011,204 B2 | 4/2015 | Raghavan et al. |
| 9,044,873 B2 | 6/2015 | Guglielmetti et al. |
| 9,050,704 B1 | 6/2015 | Liu et al. |
| 9,067,331 B2 | 6/2015 | Stang |
| 9,090,808 B1 | 7/2015 | Liu et al. |
| 9,095,955 B2 | 8/2015 | Raghavan et al. |
| 9,108,297 B2 | 8/2015 | Schubert et al. |
| 9,138,863 B2 | 9/2015 | Schubert et al. |
| 9,273,682 B2 | 3/2016 | Stang |
| 9,283,656 B2 | 3/2016 | Schubert et al. |
| 9,492,908 B2 | 11/2016 | Schubert et al. |
| 9,573,289 B2 | 2/2017 | Hashish et al. |
| 9,586,306 B2 | 3/2017 | Zhang et al. |
| 9,610,674 B2 | 4/2017 | Raghavan et al. |
| 9,636,799 B2 | 5/2017 | Liu et al. |
| 9,638,357 B1 | 5/2017 | Raghavan et al. |
| 9,649,744 B2 | 5/2017 | Raghavan et al. |
| 9,658,613 B2 | 5/2017 | Henning et al. |
| 9,720,399 B2 | 8/2017 | Henning et al. |
| 9,727,051 B2 | 8/2017 | Henning et al. |
| 9,772,620 B2 | 9/2017 | Henning et al. |
| 9,810,205 B2 | 11/2017 | Raghavan et al. |
| 9,827,649 B2 | 11/2017 | Schubert et al. |
| 9,862,073 B2 * | 1/2018 | Niblock ................ B24C 5/02 |
| 9,891,617 B2 | 2/2018 | Henning et al. |
| 9,976,675 B1 | 5/2018 | Raghavan et al. |
| 9,989,954 B2 | 6/2018 | Henning et al. |
| 10,010,999 B2 | 7/2018 | Raghavan et al. |
| 10,048,676 B2 | 8/2018 | Henning et al. |
| 10,054,118 B2 | 8/2018 | Hopkins |
| 10,146,209 B2 | 12/2018 | Henning et al. |
| 10,209,107 B2 | 2/2019 | Oki |
| 10,564,627 B2 | 2/2020 | Henning et al. |
| 10,606,240 B2 | 3/2020 | Henning et al. |
| 10,642,252 B2 | 5/2020 | Henning et al. |
| 10,656,622 B2 | 5/2020 | Henning et al. |
| 10,859,997 B1 | 12/2020 | Miles et al. |
| 10,864,613 B2 | 12/2020 | Raghavan et al. |
| 10,983,503 B2 | 4/2021 | Henning et al. |
| 10,990,080 B2 | 4/2021 | Henning et al. |
| 11,125,360 B2 | 9/2021 | Raghavan et al. |
| 2001/0002562 A1 | 6/2001 | Moutafis et al. |
| 2001/0030245 A1 | 10/2001 | Lindsey et al. |
| 2002/0056347 A1 | 5/2002 | Signey et al. |
| 2002/0066345 A1 | 6/2002 | Shepherd et al. |
| 2002/0099835 A1 | 7/2002 | Chen |
| 2003/0034122 A1 | 2/2003 | Asai |
| 2003/0057295 A1 | 3/2003 | Helmig |
| 2003/0065424 A1 | 4/2003 | Erichsen et al. |
| 2003/0085295 A1 | 5/2003 | Dijkman et al. |
| 2003/0106591 A1 | 6/2003 | Saurwein et al. |
| 2003/0106594 A1 | 6/2003 | Saurwein et al. |
| 2003/0107021 A1 | 6/2003 | Saurwein et al. |
| 2003/0148709 A1 | 8/2003 | Anand et al. |
| 2004/0107810 A1 | 6/2004 | Sciulli et al. |
| 2004/0108000 A1 | 6/2004 | Raghavan et al. |
| 2005/0017091 A1 | 1/2005 | Olsen et al. |
| 2005/0048873 A1 | 3/2005 | Alberts et al. |
| 2005/0173815 A1 | 8/2005 | Mueller |
| 2005/0252352 A1 | 11/2005 | Tateiwa |
| 2006/0223423 A1 | 10/2006 | Dorfman et al. |
| 2006/0237672 A1 | 10/2006 | Moreno et al. |
| 2006/0278613 A1 | 12/2006 | Hess |
| 2007/0021039 A1 | 1/2007 | Haslett |
| 2007/0037496 A1 | 2/2007 | Habermann et al. |
| 2007/0063066 A1 | 3/2007 | Vijay et al. |
| 2007/0131455 A1 | 6/2007 | Blange |
| 2007/0155289 A1 | 7/2007 | Miller |
| 2007/0203858 A1 | 8/2007 | Olsen |
| 2007/0218808 A1 | 9/2007 | Shimizu et al. |
| 2007/0267996 A1 | 11/2007 | Shibasaki et al. |

(56) References Cited

U.S. PATENT DOCUMENTS

| | | |
|---|---|---|
| 2008/0033593 A1 | 2/2008 | Dufort |
| 2008/0060493 A1 | 3/2008 | Liu |
| 2008/0110311 A1 | 5/2008 | Stangherlin |
| 2008/0169581 A1 | 7/2008 | Fukushima et al. |
| 2008/0282855 A1 | 11/2008 | Kanai |
| 2009/0013839 A1 | 1/2009 | Kanai et al. |
| 2009/0064832 A1 | 3/2009 | Caretta et al. |
| 2009/0071303 A1 | 3/2009 | Hashish et al. |
| 2009/0124169 A1 | 5/2009 | Alberts et al. |
| 2009/0200084 A1 | 8/2009 | Vuyk, Jr. |
| 2009/0258582 A1 | 10/2009 | Miller |
| 2009/0272245 A1 | 11/2009 | Voice et al. |
| 2009/0272409 A1 | 11/2009 | Petit |
| 2009/0288532 A1 | 11/2009 | Hashish |
| 2009/0311944 A1 | 12/2009 | Olsen |
| 2009/0318064 A1 | 12/2009 | Hashish |
| 2009/0325468 A1 | 12/2009 | El-Wardany et al. |
| 2010/0003894 A1 | 1/2010 | Miller et al. |
| 2010/0066786 A1 | 3/2010 | Yafe |
| 2010/0124872 A1 | 5/2010 | Hashish et al. |
| 2010/0227305 A1 | 9/2010 | Bakir |
| 2010/0267314 A1 | 10/2010 | Cvjeticanin et al. |
| 2010/0269593 A1 | 10/2010 | Moser et al. |
| 2011/0027032 A1 | 2/2011 | Keller et al. |
| 2011/0060439 A1 | 3/2011 | Lukis et al. |
| 2011/0135505 A1 | 6/2011 | Kieninger et al. |
| 2011/0269382 A1 | 11/2011 | Deleris |
| 2011/0287692 A1 | 11/2011 | Erichsen et al. |
| 2011/0294401 A1 | 12/2011 | Habermann et al. |
| 2012/0021676 A1 | 1/2012 | Schubert et al. |
| 2012/0022839 A1 | 1/2012 | Valicek et al. |
| 2012/0065769 A1 | 3/2012 | Knaupp et al. |
| 2012/0085211 A1 | 4/2012 | Liu et al. |
| 2012/0091382 A1 | 4/2012 | Yie |
| 2012/0196516 A1 | 8/2012 | Funatsu et al. |
| 2012/0199218 A1 | 8/2012 | Gioberti et al. |
| 2012/0217011 A1 | 8/2012 | Dotson et al. |
| 2012/0238188 A1 | 9/2012 | Miller |
| 2012/0252325 A1 | 10/2012 | Schubert et al. |
| 2012/0252326 A1 | 10/2012 | Schubert et al. |
| 2012/0282845 A1 | 11/2012 | Whang et al. |
| 2012/0309268 A1 | 12/2012 | Summers et al. |
| 2013/0025422 A1 | 1/2013 | Chillman et al. |
| 2013/0167697 A1 | 7/2013 | Reukers |
| 2013/0267152 A1 | 10/2013 | Tera et al. |
| 2013/0345853 A1 | 12/2013 | Berman et al. |
| 2014/0030963 A1 | 1/2014 | Kanazawa |
| 2014/0045409 A1 | 2/2014 | Zhang et al. |
| 2014/0051334 A1 | 2/2014 | Raghavan et al. |
| 2014/0087631 A1 | 3/2014 | Raghavan et al. |
| 2014/0252684 A1 | 9/2014 | Swanson et al. |
| 2015/0053075 A1 | 2/2015 | Rabhi |
| 2015/0134093 A1 | 5/2015 | Dos Reis Alipio Da Cruz |
| 2015/0205289 A1 | 7/2015 | Henning |
| 2015/0205290 A1 | 7/2015 | Henning |
| 2015/0205291 A1 | 7/2015 | Henning |
| 2015/0205292 A1 | 7/2015 | Henning |
| 2015/0205293 A1 | 7/2015 | Henning |
| 2015/0205295 A1 | 7/2015 | Henning |
| 2015/0205296 A1 | 7/2015 | Henning et al. |
| 2015/0251267 A1 | 9/2015 | Winn et al. |
| 2015/0360344 A1 | 12/2015 | Raghavan et al. |
| 2016/0059384 A1 | 3/2016 | Niblock |
| 2016/0223138 A1 | 8/2016 | Iijima |
| 2017/0165810 A1 | 6/2017 | Zhang et al. |
| 2017/0190021 A1 | 7/2017 | Zhang et al. |
| 2017/0255184 A1 | 9/2017 | Henning et al. |
| 2017/0322543 A1 | 11/2017 | Henning et al. |
| 2018/0059638 A1 | 3/2018 | Rydh |
| 2018/0088558 A1 | 3/2018 | Henning et al. |
| 2018/0107193 A1 | 4/2018 | Henning et al. |
| 2018/0150049 A1 | 5/2018 | Schranz |
| 2018/0161958 A1 | 6/2018 | Schubert et al. |
| 2018/0164783 A1 | 6/2018 | Henning et al. |
| 2018/0320802 A1 | 11/2018 | Raghavan et al. |
| 2018/0364679 A1 | 12/2018 | Henning et al. |
| 2019/0015928 A1 | 1/2019 | Hagenlocher et al. |
| 2019/0101894 A1 | 4/2019 | Henning et al. |
| 2019/0249805 A1 | 8/2019 | Olsen et al. |
| 2020/0007254 A1 | 1/2020 | Hay et al. |
| 2021/0046610 A1 | 2/2021 | Schubert et al. |
| 2021/0187778 A1 | 6/2021 | Denney et al. |
| 2021/0192922 A1 | 6/2021 | Vandergon et al. |
| 2021/0221534 A1 | 7/2021 | Henning et al. |
| 2021/0291332 A1 | 9/2021 | Vandergon et al. |
| 2021/0299903 A1 | 9/2021 | Osterhouse |
| 2021/0299904 A1 | 9/2021 | Osterhouse |
| 2021/0301936 A1 | 9/2021 | Osterhouse et al. |

FOREIGN PATENT DOCUMENTS

| | | |
|---|---|---|
| CN | 104625969 A | 5/2015 |
| CN | 105945966 A | 9/2016 |
| DE | 4422691 A1 | 1/1996 |
| DE | 10214251 C1 | 8/2003 |
| EP | 0165690 A2 | 12/1985 |
| EP | 1116543 A2 | 7/2001 |
| EP | 2236893 A3 | 1/2011 |
| EP | 2584419 A2 | 4/2013 |
| FR | 2659264 A1 | 3/1990 |
| GB | 2198975 A | 6/1988 |
| JP | 2012157956 A | 8/2012 |
| TW | 1544982 B | 8/2016 |
| WO | 94025209 A1 | 11/1994 |
| WO | 02085572 A1 | 10/2002 |
| WO | 03011524 A1 | 2/2003 |
| WO | 03089999 A1 | 10/2003 |
| WO | 2009050251 A1 | 4/2009 |
| WO | 2011042244 A2 | 4/2011 |
| WO | 2013109473 A1 | 7/2013 |

OTHER PUBLICATIONS

Tech Briefs. "The Basics of Encoder Selection" (2017). Found at https://www.techbriefs.com/component/content/article/tb/supplements/md/features/articles/26431 (Year: 2017).*

Bullock, Thomas B., Motion Control and Industrial Controllers, Motion Control, Sep./Oct. 1990.

Olsen, J. et al., "Advanced Error Correction Methodology Applied to Abrasive Waterjet Cutting," 2003 WJTA American Water Jet Conference, OMAX Corporation, Kent, WA, USA, Aug. 2003, pp. 1-15.

Henning et al., "Jetting Technology, Cutting-Edge Quality Improvements through geometrical modelling," Fraunhofer Institute for Manufacturing Engineering and Automation, Stuttgart, Germany, Sep. 21-23, 1998, pp. 321-329.

"Memory water jet milling," http://www.computescotland.com/memory-water-jet-milling-5236.php , Apr. 24, 2012, 4 pages.

KERN Laser Systems, "3D Laser Engraving System," http://www.kernlasers.com/3d_laser_engraving.htm, downloaded on Oct. 5, 2010.

"Custom Fabricator PIW Corporation Couples 'Tool Box' of Innovation, High Tech Equipment and Craftsmanship with Swat Team Approach," Waterjet Success Stories, PIW Corp. Homer Glen, Illinois, 1993.

Epilog Laser 2009, Zing Laser 3D Engraving, http://www.epiloglaser.com/zing_3d_engraving.htm.

International Search Report and Written Opinion for PCT/US13/55475 filed Aug. 16, 2013, dated Dec. 6, 2013, 21 pages.

Miller, D.S., "New Abrasive Waterjet Systems to Compete with Lasers," 2005 WJTA American Waterjet Conference, Aug. 21-23, 2005, Houston, Texas, 11 pages.

Hashish, M., "Waterjet Machine Tool of the Future," 9th American Waterjet Conference, Aug. 23-26, 1997, Dearborn, Michigan, Paper No. 58, 15 pages.

Hashish, Mohamed, "Visualization of the Abrasive-Waterjet Cutting Process," from Experimental Mechanics, Jun. 1988.

(56) References Cited

OTHER PUBLICATIONS

Kovacevic, R., "State of the Art of Research and Development in Abrasive Waterjet Machining," Transactions of the ASME, vol. 119, Nov. 1997, pp. 776-785.

* cited by examiner

ARTICULATING APPARATUS OF A WATERJET SYSTEM AND RELATED TECHNOLOGY

INCORPORATION BY REFERENCE

The present application claims priority to U.S. Provisional Patent Application No. 62/630,135, filed Feb. 13, 2018, and titled ARTICULATING APPARATUS OF A WATERJET SYSTEM AND RELATED TECHNOLOGY. Additionally, U.S. patent application Ser. No. 14/333,469, filed on Jul. 16, 2014, and titled GENERATING OPTIMIZED TOOL PATHS AND MACHINE COMMANDS FOR BEAM CUTTING TOOLS is incorporated herein by reference in its entirety. To the extent the foregoing application or any other material incorporated herein by reference conflicts with the present disclosure, the present disclosure controls.

BACKGROUND

Waterjet systems (e.g., abrasive-jet systems) are used in precision cutting, shaping, carving, reaming, and other material-processing applications. During operation, waterjet systems typically direct a high-velocity jet of fluid (e.g., water) toward a workpiece to rapidly erode portions of the workpiece. Abrasive material can be added to the fluid to increase the rate of erosion. When compared to other material-processing systems (e.g., grinding systems, plasma-cutting systems, etc.) waterjet systems can have significant advantages. For example, waterjet systems often produce relatively fine and clean cuts, typically without heat-affected zones around the cuts. Waterjet systems also tend to be highly versatile with respect to the material type of the workpiece. The range of materials that can be processed using waterjet systems includes very soft materials (e.g., rubber, foam, leather, and paper) as well as very hard materials (e.g., stone, ceramic, and hardened metal). Furthermore, in many cases, waterjet systems are capable of executing demanding material-processing operations while generating little or no dust, smoke, and/or other potentially toxic byproducts.

In a typical waterjet system, a pump pressurizes fluid to a high pressure (e.g., 40,000 psi to 100,000 psi or more). Some of this pressurized fluid is routed through a cutting head that includes an orifice element having an orifice. Passing through the orifice converts static pressure of the fluid into kinetic energy, which causes the fluid to exit the cutting head as a jet at high velocity (e.g., up to 2,500 feet-per-second or more) and impact a workpiece. The orifice element can be a hard jewel (e.g., a synthetic sapphire, ruby, or diamond) held in a suitable mount (e.g., a metal plate). In many cases, a jig supports the workpiece. The jig, the cutting head, or both can be movable under computer and/or robotic control such that complex processing instructions can be executed automatically.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology. For ease of reference, throughout this disclosure identical reference numbers may be used to identify identical or at least generally similar or analogous components or features.

DETAILED DESCRIPTION

Waterjet systems typically include a carriage connected to an x/y motion assembly that precisely positions the carriage in a horizontal plane. The carriage carries a cutting-head assembly including an elongate nozzle through which a waterjet travels axially toward a workpiece. In some waterjet systems, the nozzle is fixedly connected to the carriage such that the carriage can move the nozzle horizontally relative to the workpiece, but the nozzle cannot tilt relative to the workpiece. This type of system is well-suited for making through cuts and straight blind cuts in a stationary workpiece, which may be sufficient to form simple three-dimensional products. Forming complex three-dimensional products, however, typically requires use of a cutting-head assembly that allows the nozzle to tilt relative to a workpiece. Some conventional cutting-head assemblies that allow the nozzle to tilt relative to a workpiece include a kinematic chain with a first joint and a second joint in series between the nozzle and the carriage. The first joint allows the nozzle to rotate within a limited range about an off-vertical axis. The second joint allows the nozzle to rotate 360 degrees about a vertical axis. Together, these joints allow the nozzle to move into any orientation in a spherical sector defined by the range of motion of the first joint.

Conventional two-joint cutting-head assemblies tend to be well-suited for processing that calls for infrequent large (e.g., greater than 30-degree) angular changes in the orientation of the nozzle. These conventional cutting-head assemblies, however, tend to be poorly suited for processing that calls for frequent small (e.g., less than 10-degree) angular changes in the orientation of the nozzle. When the vertical axis of the second joint of a conventional two cutting-head assembly is coincident with the nozzle axis (also the waterjet axis), operating the second joint has no effect on the orientation of the nozzle. This is known as a kinematic singularity. Near this kinematic singularity, the math that conventional waterjet systems use to determine the respective positions of the first and second joints to cause a desired orientation of the nozzle automatically calls for large rotations of the second joint. These large rotations of the second joint tend to be disproportionate to the magnitude of the desired angular change in the orientation of the nozzle. Often, the time required to execute these large rotations of the second joint necessitates a temporarily decrease in cutting speed (i.e., the speed at which the motion system moves the nozzle horizontally). After a large rotation of the second joint is complete, the cutting speed may return to a steady-state speed. This is problematic because waterjet processing is time dependent. Unlike a conventional milling tool (e.g., a grinding head), a waterjet forms a kerf in a workpiece by erosion that progresses laterally to different extents depending on the speed at which the waterjet moves relative to the workpiece. In general, slower cutting speeds correspond to wider kerfs and faster cutting speeds correspond to narrower kerfs. When cutting speed changes to accommodate operation of the second joint of a conventional two cutting-head assembly during operation of the cutting-head assembly near a kinematic singularity, the overall kerf width for a cutting project will be variable. This, in turn, reduces the dimensional accuracy of the product.

Compounding the kinematic-singularity problem is the fact that operating a conventional two-joint cutting-head assembly near the vertical-axis kinematic singularity can be very useful. For example, slightly tilting the nozzle in the direction of travel can increase cutting efficiency. In addition (and usually more importantly) slightly tilting the nozzle away from an adjacent product wall is often the best way to reduce or eliminate undesirable taper. In waterjet processing, taper refers to a difference between the kerf width at the top of a cut and the kerf width at the bottom of the cut. A typical waterjet cut has a slight taper, the most common type being V-shaped taper. V-shaped taper occurs because a waterjet loses some of its cutting energy as it cuts deeper into a workpiece. Slightly more material is removed at the top of the cut where the waterjet enters the workpiece, than at the bottom of the cut where the waterjet exits the workpiece. V-shaped taper is usually associated with fast cutting. In general, the greater the cutting speed, the more pronounced the taper. Slightly tilting the nozzle away from being perfectly aligned with the desired orientation of an adjacent product wall shifts the taper to a scrap wall opposite to the product wall. This offsetting technique is very effective for reducing or eliminating the effect of taper on the dimensional uniformity of the product wall.

The optimum nozzle tilt for reducing taper usually varies over the course of a cutting project. For example, when cutting speed during a cutting project is low (e.g., as the waterjet approaches a corner), the effect of taper may be less pronounced. In contrast, when cutting speed is high (e.g., along a straight cut), the effect of taper may be more pronounced. Accordingly, it can be desirable to reduce nozzle tilt in the former case to avoid overcompensating for the taper, and to increase the nozzle tilt in the latter case to avoid undercompensating for the taper. These changes in nozzle tilt can be called for in any direction depending on the orientation of the product wall adjacent to the waterjet. Cutting speed changes may occur frequently over the course of a cutting project, particularly if the desired product wall has many corners. Furthermore, the optimum nozzle tilt to reduce or eliminate taper is usually less than 10 degrees from the cut surface. A cutting program that includes nozzle tilt to reduce or eliminate taper, therefore, often includes frequent small angular changes in the orientation of the nozzle.

If not for speed-related and taper-related nozzle tilt, most waterjet processing would occur with the nozzle in a vertical orientation to form vertical product walls. Indeed, this is the orientation of the nozzle in most (if not all) waterjet systems in which the nozzle is fixed relative to the carriage. When speed-related and/or taper-related nozzle tilt is/are introduced into a typical cutting project, the specified nozzle tilt tends to be within 10 degrees off vertical. As discussed above, in a conventional two-joint cutting-head assembly, the second joint rotates about a vertical axis that aligns with the nozzle axis at a kinematic singularity. Therefore, implementing speed-related and/or taper-related nozzle tilt with a conventional two cutting-head assembly would involve frequent small angular changes in the orientation of the nozzle near the vertical-axis kinematic singularity. This would be impractical because the cutting speed would need to decrease to allow time for the second joint to make frequent large rotations. The inventors recognized that one approach to addressing this problem is to allow the position of the second axis of a two joint cutting-head assembly to be variable. This reduces kinematic-singularity-related delay in simple cutting projects calling for forming mostly vertical product walls. A problem with this approach, however, is that kinematic-singularity-related delay may still occur in more complex cutting projects calling for forming off-vertical product walls. The inventors further recognized that adding a third joint to the kinematic chain between the nozzle and the carriage would allow kinematic-singularity-related delay to be reduced significantly even in complex cutting projects.

Systems, devices, and methods in accordance with embodiments of the present technology can at least partially address one or more of the problems described above and/or other problems associated with conventional technologies whether or not stated herein. For example, waterjet systems in accordance with at least some embodiments of the present technology have features that facilitate reliably avoiding kinematic-singularity-related delay. Specific details of systems, devices, and methods in accordance with various embodiments of the present technology are disclosed herein with reference to FIGS. 1-7. Although the systems, devices, and methods may be disclosed herein primarily or entirely with respect to waterjet applications, other applications in addition to those disclosed herein are within the scope of the present technology. For example, suitable features of described waterjet systems can be implemented in the context of plasma-cutting systems or other types of beam-cutting systems. Furthermore, it should be understood, in general, that other systems, devices, and methods in addition to those disclosed herein are within the scope of the present technology. For example, systems, devices, and methods in accordance with embodiments of the present technology can have different and/or additional configurations, components, and procedures than those disclosed herein. Moreover, a person of ordinary skill in the art will understand that systems, devices, and methods in accordance with embodiments of the present technology can be without one or more of the configurations, components, and/or procedures disclosed herein without deviating from the present technology.

Waterjet systems in accordance with at least some embodiments of the present technology can be used with a variety of suitable fluids, such as water, aqueous solutions, hydrocarbons, glycols, and nitrogen. As such, although the term "waterjet" is used herein for ease of reference, unless the context clearly indicates otherwise, the term refers to a jet formed by any suitable fluid, and is not limited exclusively to water or aqueous solutions. The term "fluid," as used herein, encompasses any suitable fluid phase depending on the context. Furthermore, the term "fluid," as used herein, may be substituted in suitable instances with any of the narrower terms "aqueous fluid," "water," "liquid," "aqueous liquid," and "liquid water" to indicate common examples of suitable fluids in the context of waterjet processing. References herein to "ultrahigh pressures" refer to pressures suitable for high-volume waterjet processing of relatively hard materials. For example, the "ultrahigh pressures" described herein can be pressures greater than 30,000 psi, such as pressures within a range from 30,000 psi to 120,000 psi. It should be understood, however, that at least some features of the present technology can also be useful in the context of waterjet processing at lower pressures, such as pressures from 5,000 psi to 30,000 psi. Finally, unless the context clearly indicates otherwise, the terms "cutting," "cut," and the like refer to any suitable material modification caused by a waterjet, such as through cutting, piercing, shaping, carving, reaming, etching, milling, eroding, etc.

Figure 1:
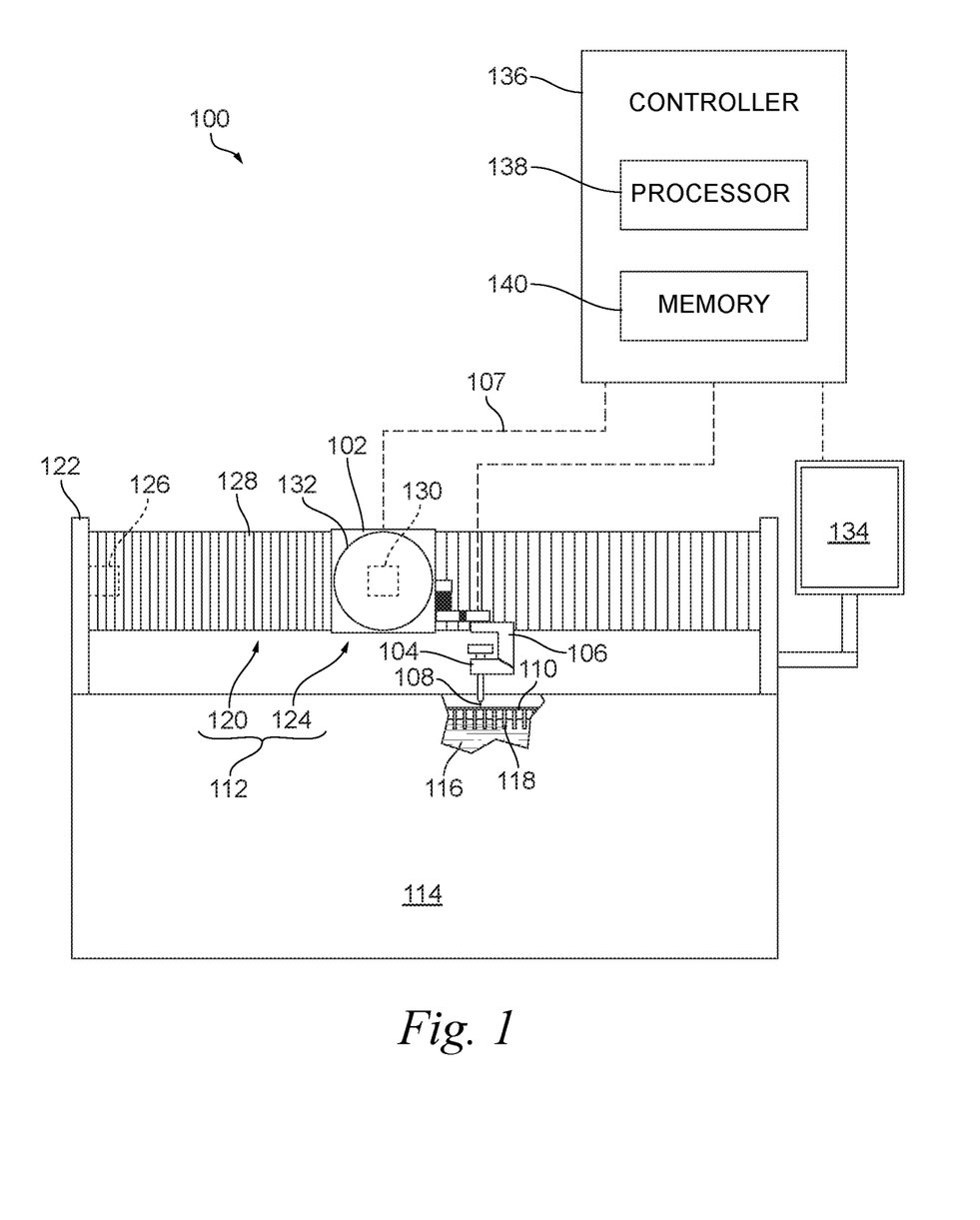
FIG. 1 is a partially schematic and partially cross-sectional profile view of a waterjet system in accordance with at least some embodiments of the present technology.

FIG. 1 is a partially schematic and partially cross-sectional profile view of a waterjet system 100 in accordance with at least some embodiments of the present technology. As shown in FIG. 1, the waterjet system 100 can include a carriage 102 carrying a cutting head 104 via a kinematic chain 106. The cutting head 104 can be configured to direct a waterjet 108 toward a workpiece 110. The kinematic chain 106 can be configured to raise, lower, and tilt the cutting head 104 relative to the workpiece 110 while the cutting head 104 directs the waterjet 108 toward the workpiece 110. The waterjet system 100 can further include a motion assembly 112 configured to move the carriage 102 horizontally relative to the workpiece 110 while the cutting head 104 directs the waterjet 108 toward the workpiece 110. Below the carriage 102, the waterjet system 100 can include a catcher 114 containing a liquid reservoir 116 that dissipates the energy of the waterjet 108 after the waterjet 108 passes through the workpiece 110. The waterjet system 100 can also include slats 118 within the catcher 114 that support the workpiece 110. Ultrahigh pressure fluid lines, abrasive lines, and pneumatic lines associated with forming the waterjet 108 and operating the cutting head 104 are not shown in FIG. 1 to enhance clarity.

The motion assembly 112 can include an x-axis subassembly 120 extending between two mounting towers 122 extending upwardly from the catcher 114. The motion assembly 112 can also include a y-axis subassembly 124 perpendicular to the x-axis subassembly 120. The x-axis subassembly 120 can include an x-axis actuator 126 within an x-axis bellow seal 128. Similarly, the y-axis subassembly 124 can include a y-axis actuator 130 within a y-axis bellow seal 132. The x-axis subassembly 120 and the y-axis subassembly 124 can also include internal tracks, joints, actuators, etc., which are not shown in FIG. 1 to enhance clarity. The cutting head 104 can be connected to the x-axis subassembly 120 via the y-axis subassembly 124 such that the x-axis subassembly 120 moves both the cutting head 104 and the y-axis subassembly 124. Together, the x-axis subassembly 120 and the y-axis subassembly 124 can move the cutting head 104 to any desired horizontal position within a rectangular field. In FIG. 1, the y-axis subassembly 124 is shown cantilevered off the x-axis subassembly 120. Alternatively, a counterpart of the y-axis subassembly 124 can be part of a bridge extending between two counterparts of the x-axis subassembly 120.

With continued reference to FIG. 1, the waterjet system 100 can further include a user interface 134 and a controller 136. The user interface 134 can be configured to receive input from a user of the waterjet system 100 and to send data based on the input to the controller 136. The input can include, for example, one or more specifications (e.g., coordinates, geometries, dimensions, etc.) of a cutting project. The controller 136 can include a processor 138 and memory 140 and can be programmed with instructions (e.g., non-transitory instructions contained on a computer-readable medium) that, when executed, control operation of the waterjet system 100. The controller 136 can be operably connected to the user interface 134, to the motion assembly 112, and to the kinematic chain 106 via communication links 107. The communication links 107 can be separate or combined, and can have any suitable form. For example, the communication links 107 can include any suitable wired and/or wireless communication components, such as wires and transceivers (e.g., antennas, Wi-Fi access points, Bluetooth transceivers, nearfield communication devices, wireless modems, etc.). In some cases, the controller 136 is local. In other cases, the controller 136 is remote. Furthermore, communication between the controller 136 and other components of the waterjet system 100 can be direct or indirect (e.g., via the Internet and/or via an intermediate computing system).

Figure 2:
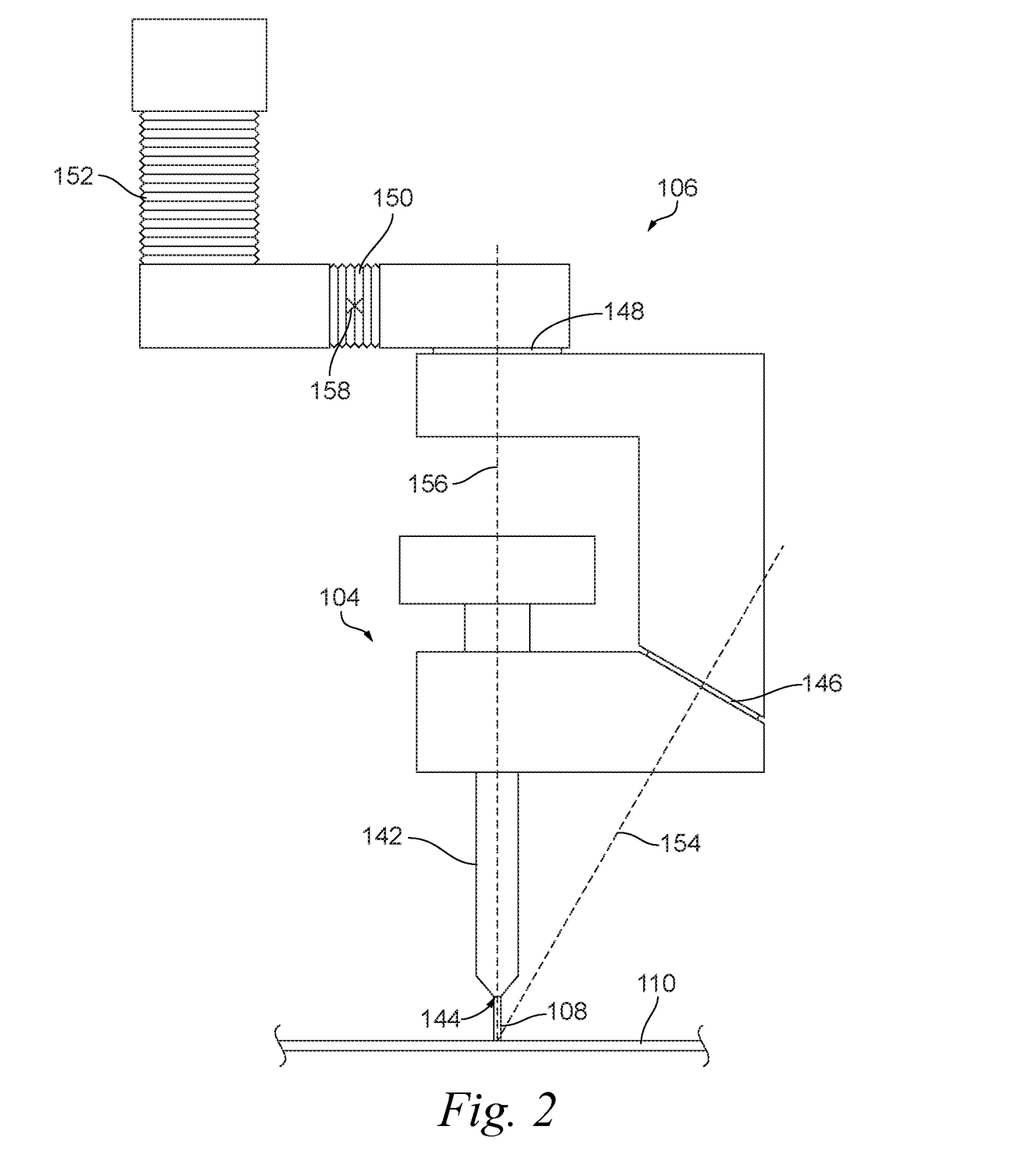
FIG. 2 is a profile view of a cutting head and kinematic chain of the waterjet system shown in FIG. 1 with a nozzle of the cutting head in a vertical orientation.
Figure 3:
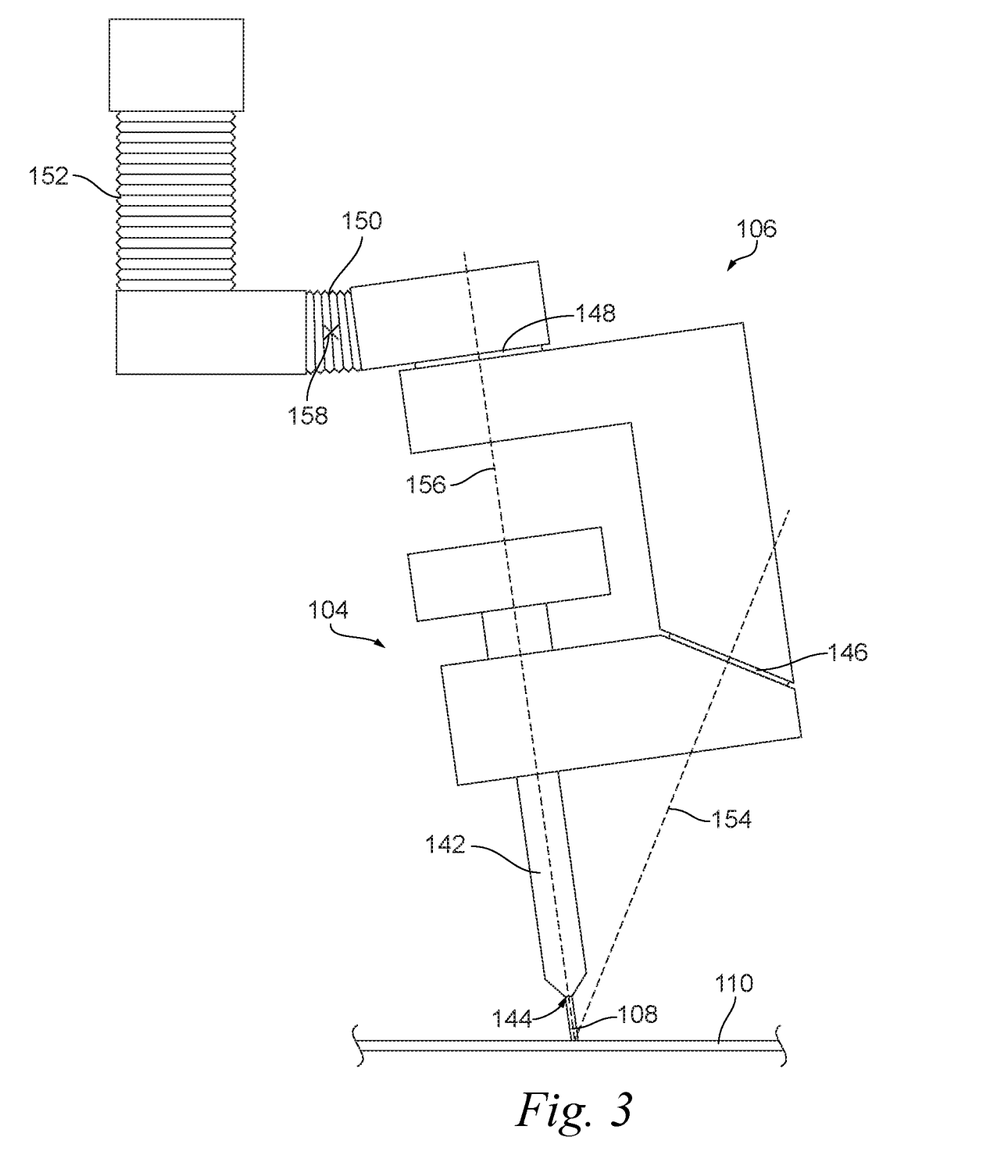
FIG. 3 is a profile view of the cutting head and kinematic chain of the waterjet system shown in FIG. 1 with the nozzle of the cutting head in an off-vertical orientation.

FIGS. 1 and 2 are profile views of the cutting head 104 and the kinematic chain 106 of the waterjet system 100. With reference to FIGS. 1-3 together, the cutting head 104 can include an elongate nozzle 142 and a waterjet outlet 144 at a distal end of the nozzle 142. The kinematic chain 106 can include a first joint 146, a second joint 148, and a third joint 150 rotatable about different respective axes. The first joint 146 can be in series between the cutting head 104 and the second joint 148. The second joint 148 can be in series between the first joint 146 and the third joint 150. The third joint 150 can be in series between the second joint 148 and the carriage 102. In at least some cases, the kinematic chain 106 also includes a fourth joint 152 in series between the third joint 150 and the carriage 102. The fourth joint 152 can be linearly adjustable to move the cutting head 104 vertically relative to the carriage 102.

The first joint 146, the second joint 148, and the third joint 150 can be rotatably adjustable about a first axis 154 (illustrated as a line), a second axis 156 (also illustrated as a line), and a third axis 158 (illustrated as an "x"), respectively, within a first range of motion, a second range of motion, and a third range of motion, respectively. The second range of motion can be greater than the first range of motion. Furthermore, the third range of motion can be less than the first range of motion and less than the second range of motion. For example, the third range of motion can be less than or equal to 30 degrees (e.g., less than or equal to 60 degrees and/or less than or equal to 90 degrees), the first range of motion can be greater than 30 degrees and less than 360 degrees (e.g., greater than 60 degrees and less than 360 degrees), and the second range of motion can be greater than or equal to 360 degrees (e.g., +/−180 degrees, +/−360 degrees, +/−720 degrees, etc.). Each of the first joint 146, the second joint 148, and the third joint 150 can include a rotary actuator (not shown) configured to automatically execute movement instructions from the controller 136. The fourth joint 152 can include a linear actuator (also not shown) configured to automatically execute movement instructions from the controller 136.

Rotatably adjusting the second joint 148 about the second axis 156 can change the position of the first axis 154. Similarly, rotatably adjusting the third joint 150 about the third axis 158 can change the respective positions of the first and second axes 154, 156. Rotatably adjusting the third joint 150 about the third axis 158 can also move the third joint 150 between a first state shown in FIG. 2 and a second state shown in FIG. 3. The second axis 156 can be vertical when the third joint 150 is in the first state and not vertical when the third joint 150 is in the second state. The second and third axes 156, 158 can have a fixed relationship, such as a fixed perpendicular relationship. Similarly, the first and second axes 154, 156 can have a fixed relationship, such as a fixed coplanar relationship with a fixed intervening angle (e.g., 30 degrees). In at least some cases, the third axis 158 is horizontal. Together, the first and second joints 146, 148 can cause the nozzle 142 to have a specified orientation relative to the workpiece 110 at a given time during a cutting project. Meanwhile, the motion assembly 112 and the fourth joint 152 can cause the nozzle 142 to have specified horizontal and vertical positions, respectively, relative to the workpiece 110. The nozzle 142 is shown coaxially aligned with the second axis 156 in FIGS. 2 and 3 to enhance clarity. During normal operation of the waterjet system 100, the nozzle 142 may or may not be aligned with the second axis 156 at any given time.

Operating the third joint 150 is not necessary to achieve a full range of orientations of the nozzle 142. In other words, by operating only the first joint 146 and the second joint 148 the nozzle 142 can be oriented at any suitable angle relative to the workpiece 110 in a spherical sector defined by the range of motion of the first joint 146. It is understandable, then, that conventional waterjet systems configured to make angled cuts in workpieces do not include a counterpart of the third joint 150. These conventional waterjet systems can be characterized as two-axis systems. In contrast, the waterjet system 100 can be characterized as a three-axis system. Adding the third joint 150 adds cost and complexity to the waterjet system 100, but the inventors have discovered that the previously unrecognized benefits of the third joint 150 can outweigh this cost and complexity. Among these benefits is the potential to use the third joint 150 to move a kinematic singularity as needed to reduce or eliminate kinematic-singularity-related delay for a cutting project. This is particularly useful for cutting projects that call for tilting the nozzle 142 to reduce or eliminate taper in a product wall. As discussed above, the appropriate nozzle tilts for reducing or eliminating taper in a product wall typically change frequently within a small range in concert with changes in cutting speed. These conditions exacerbate kinematic-singularity-related delay when a kinematic singularity is within the small range. On the other hand, shifting the kinematic singularity by just a small angle can eliminate or nearly eliminate this problem.

The third joint 150 can have one or more than one position during a single cutting project. For example, when the third joint 150 has a position that shifts a kinematic singularity so that the entire path the cutting head 104 is to follow to form a product does not cross or closely approach the kinematic singularity, maintaining the third joint 150 in that position throughout the cutting project may be appropriate. Alternatively, the third joint 150 may have different positions during different respective portions of a single cutting project when there is not a position of the third joint 150 suitable for reducing or eliminating kinematic-singularity-related delay at all portions of the cutting project. In at least the former case, it can be advantageous for the third joint 150 to be manually adjustable. In at least the latter case, it can be advantageous for the third joint 150 to be automatically adjustable. In FIGS. 1 and 2, the third joint 150 is shown as an automatically (not manually) adjustable joint. As discussed below with reference to FIGS. 4A-4B, in other cases, a counterpart of the third joint 150 can be manually adjustable. In these and still other cases, counterparts of the first and second joints 146, 148 can be automatically adjustable.

Figures 4A, 4B:
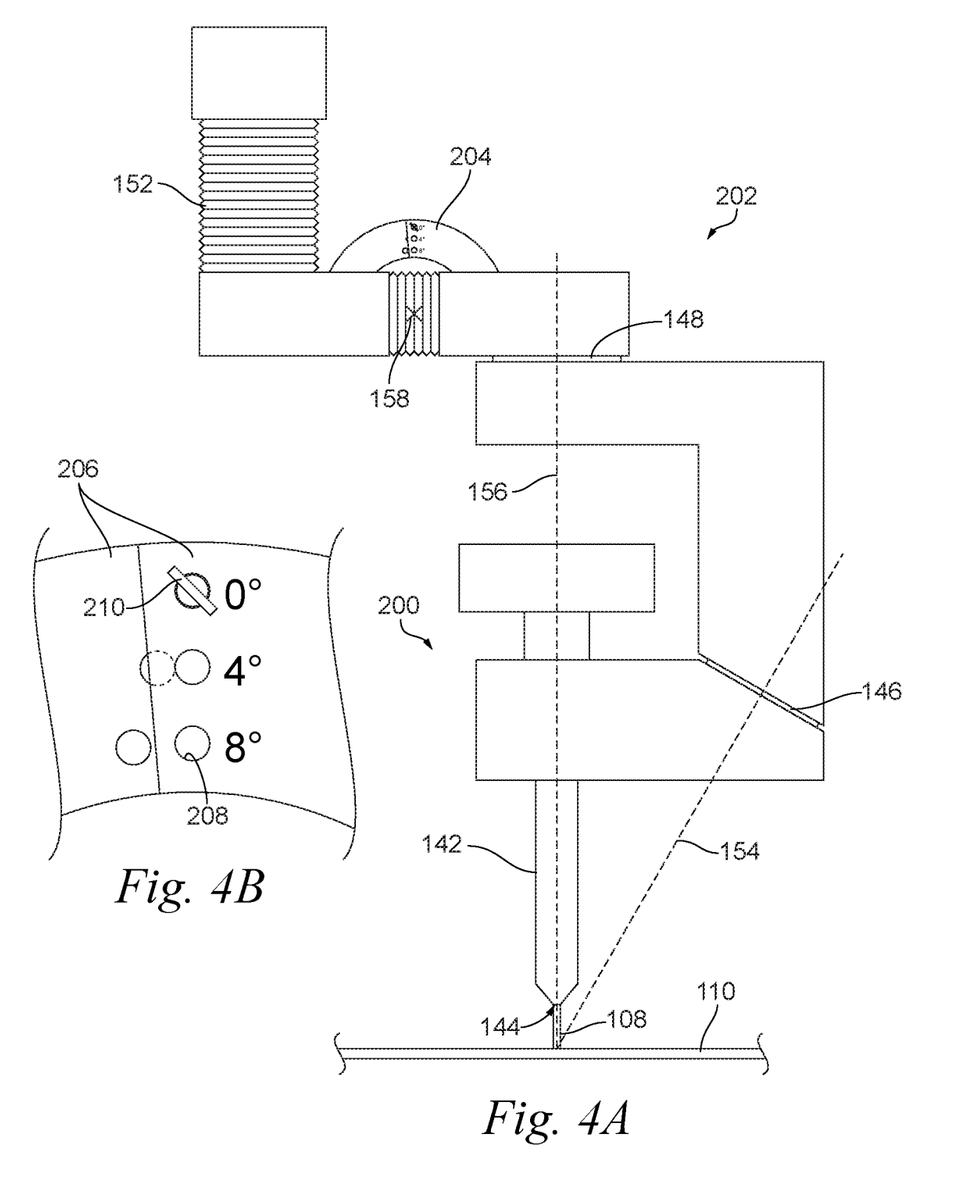
FIG. 4A is a profile view of a cutting head and kinematic chain of a waterjet system in accordance with at least some embodiments of the present technology with a nozzle of the cutting head in a vertical orientation.
FIG. 4B is an enlarged view of a portion of FIG. 4A.
Figures 5A, 5B:
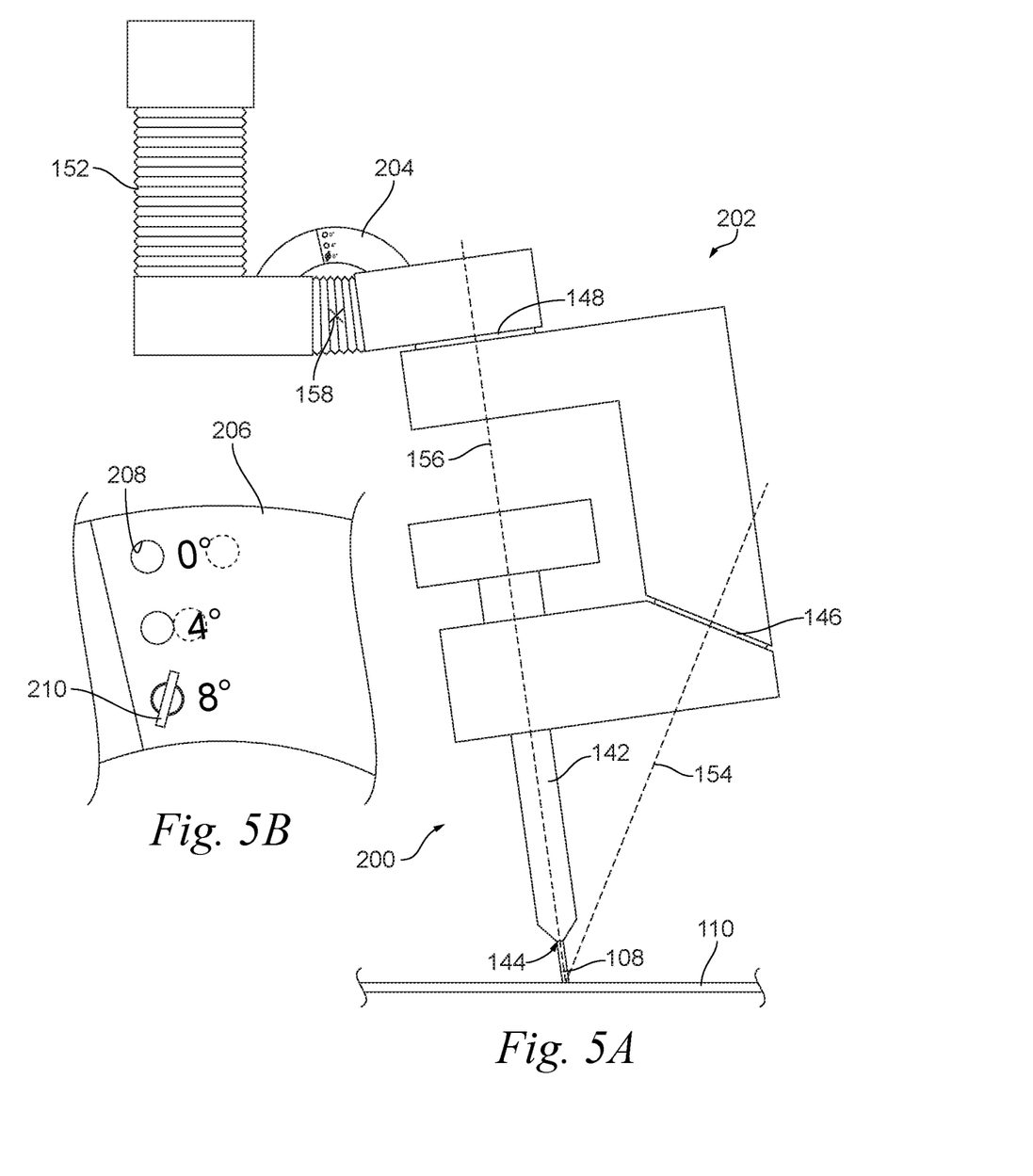
FIG. 5A is a profile view of the cutting head and kinematic chain shown in FIG. 4A with the nozzle of the cutting head in an off-vertical orientation.
FIG. 5B is an enlarged view of a portion of FIG. 5A.

FIGS. 4A and 5A are profile views of the cutting head 200 and a kinematic chain 202 of a waterjet system in accordance with at least some embodiments of the present technology. FIGS. 4B and 5B are enlarged views of portions of FIGS. 4A and 5A, respectively. With reference to FIGS. 4A-5B together, the kinematic chain 202 can include a third joint 204 that is manually adjustable to any one of three states. For example, the third joint 204 can include partially overlapping plates 206 with holes 208 that align from one plate 206 to the other plate 206 when the third joint 204 is in a given one of the three states. The third joint 204 can also include a pin 210 shaped to be inserted through an aligned pair of the holes 208 to hold the third joint 204 in a corresponding one of the states. In the illustrated case, the three states are a zero-degree angle, a four-degree angle, and an eight-degree angle. In FIGS. 4A and 4B, the pin 210 is inserted into the holes 208 corresponding to the zero-degree angle. In FIGS. 5A and 5B, the pin 210 is inserted into the holes 208 corresponding to the eight-degree angle. Whether manually adjustable or automatically adjustable, the third joint 204 and its counterparts can be step joints with a relatively small number of steps (e.g., at most 10 steps) rather than infinitely variable joints. This can be useful, for example, to reduce the complexity of the math used to control operation of the overall kinematic chain 202. In other cases, counterparts of the third joint 204 can be manually or automatically adjustable continuously rather than stepwise.

Figure 6:
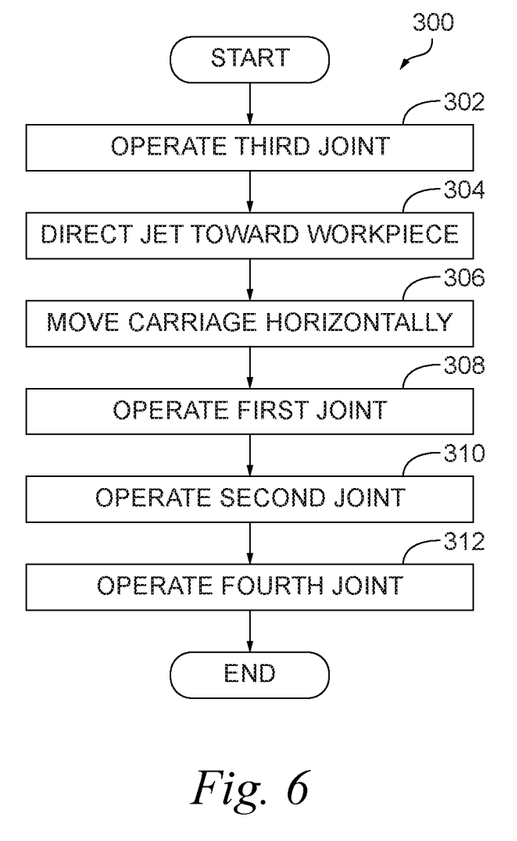
FIGS. 6 and 7 are flow charts illustrating methods for operating a waterjet system in accordance with at least some embodiments of the present technology.
Figure 7:
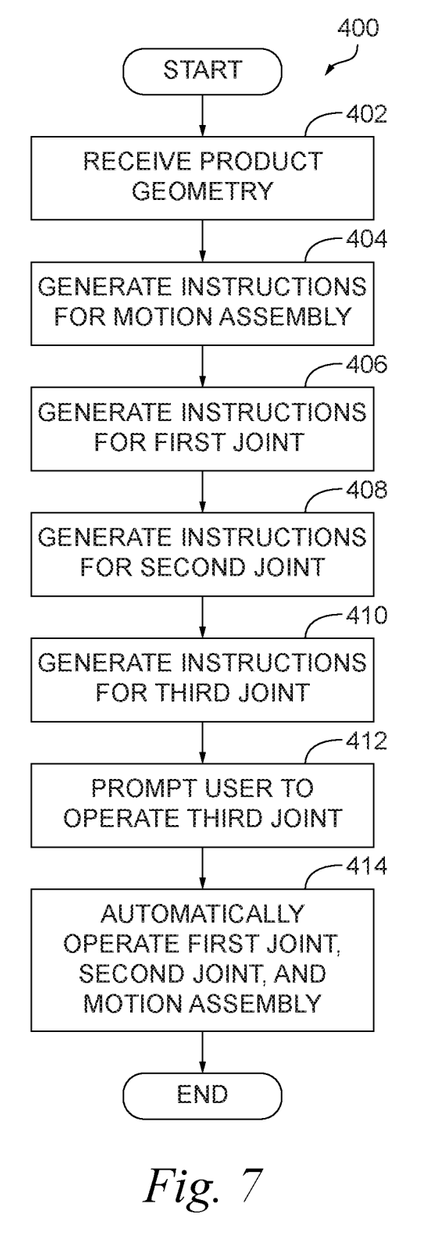

FIGS. 6 and 7 are flow charts illustrating methods 300, 400, respectively, for operating a waterjet system in accordance with at least some embodiments of the present technology. The methods 300, 400 will be described with reference to features of the waterjet system 100 shown in FIGS. 1-3. It should be understood, however, that the methods 300, 400 and counterparts thereof are not limited to these features. As shown in FIG. 6, the method 300 can include operating the third joint 150 to rotate the cutting head 104, the first joint 146, and the second joint 148 about the third axis 158 relative to the workpiece 110 (block 302). For example, this can include moving the third joint 150 from a first state in which the second axis 156 is vertical to a second state in which the second axis 156 is not vertical. Alternatively or in addition, operating the third joint 150 can include moving the third joint 150 between two or more states in which the second axis 156 is off vertical by different respective angles. The movement of the third joint 150 can be stepwise or continuous, and can be automatic or manual. Next, the method 300 can include directing the waterjet 108 toward the workpiece 110 via the cutting head 104 (block 304). In some cases, moving the third joint 150 occurs only before directing the waterjet 108 toward the workpiece 110. In other cases, moving the third joint 150 occurs while directing the waterjet 108 toward the workpiece 110.

The method 300 can further include moving (e.g., at varying speed) the carriage 102 horizontally relative to the workpiece 110 (block 306), operating the first joint 146 to rotate the cutting head 104 about the first axis 154 relative to the workpiece 110 (block 308), operating the second joint 148 to rotate the cutting head 104 and the first joint 146 about the second axis 156 relative to the workpiece 110 (block 310), and operating the fourth joint 152 to move the cutting head 104, the first joint 146, the second joint 148, and the third joint 150 vertically relative to the workpiece 110 (block 312). These operations can occur automatically in concert while directing the waterjet 108 toward the workpiece 110. Together, these operations can move the cutting head 104 along a path configured to form a product from the workpiece 110. The waterjet 108 can have different angles off vertical at different respective portions of the path. In at least some cases, the path includes adjustments in an angle by which the waterjet 108 is tilted relative to an adjacent wall of the product, thereby reducing or eliminating taper in the wall of the product, the taper being that associated with a non-cylindrical shape of the waterjet 108. When the speed at which the carriage 102 moves horizontally relative to the workpiece 110 varies, the adjustments in the angle by which the waterjet 108 is tilted relative to the adjacent wall of the product can at least partially compensate for an effect of the varying speed on the taper. Moving the third joint 150, which (as mentioned above) can occur before and/or while moving the cutting head 104 along the path, can shift a kinematic singularity away from the path.

As shown in FIG. 7, the method 400 can include receiving a geometry of a product to be cut from the workpiece 110 (block 402). For example, the geometry can be vector model of the product. The method 400 can further include generating instructions for moving the cutting head 104 along a path relative to the workpiece 110 while the cutting head 104 directs the waterjet 108 toward the workpiece 110 to form the product. This can include generating instructions for operating the motion assembly 112 (block 404), generating instructions for operating the first joint 146 (block 406), generating instructions for operating the second joint 148 (block 408), and generating instructions for operating the third joint 150 (block 410). The instructions for operating the motion assembly 112 can include instructions for operating the motion assembly 112 to move the cutting head 104 horizontally at different respective speeds at different respective portions of the path. Correspondingly, the instructions for operating the first and second joints 146, 148 can include instructions for operating the first and second joints 146, 148 to at least partially compensate for an effect of the different horizontal speeds on taper in a wall of the product, the taper being that associated with a non-cylindrical shape of the waterjet 108. In these and other cases, the instructions for operating the first and second joints 146, 148 can include instructions for operating the first and second joints 146, 148 to reduce or eliminate the taper. The instructions for operating the third joint 150 can include instructions for operating the third joint 150 to shift a kinematic singularity away from the path.

The method 400 can further include prompting a user of the waterjet system 100 to manually operate the third joint 150 to shift a kinematic singularity away from the path. For example, the controller 136 can calculate a suitable position for the third joint 150 to avoid kinematic singularities based on the complete instructions for a given cutting operation. A corresponding algorithm can include determining the angle between the nozzle axis and the second axis 156 at each increment during the cutting operation, calculating a minimum angle of the third joint 150 to prevent the angle between the nozzle axis and the second axis 156 from being zero at any increment, and then adding a buffer (e.g., 10 degrees) to the calculated minimum angle. The controller 136 can then determine a setting (e.g., a stepwise setting) for the suitable position of the third joint 150. The waterjet system 100 can then communicate this setting to a user of the waterjet system 100 via the user interface 134. After the user manually operates the third joint 150 in response to the communication, the method 400 can include automatically operating the first joint 146, the second joint 148, and the motion assembly 112 based at least partially on the instructions. Alternatively, the controller 136 can automatically operate the first joint 146, the second joint 148, the third joint 150, and the motion assembly 112 based at least partially on the instructions.

The third joint 150 can have the same or different positions during the full duration of a cutting operation. Causing the third joint 150 to have different positions during the full duration of a cutting operation can be useful, for example, when the cutting operation involves forming walls at significantly different respective angles off vertical and compensating for taper. In these and other cases, no single position of the third joint 150 may be adequate to avoid kinematic singularities throughout the full duration of the cutting operation. Accordingly, the controller 136 can determine different suitable positions for the third joint 150 at different respective portions of the cutting operation. A corresponding algorithm can be the same as the algorithm described above for determining a single suitable position for the third joint 150, except performed on different subsets of all increments within the cutting operation. When the subsets are very small, control of the third joint 150 can be dynamic and in concert with operation of the first joint 146 and the second joint 148. Other control methods involving the third joint 148 are also possible.

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. Accordingly, this disclosure and associated technology can encompass other embodiments not expressly shown or described herein. In some cases, well-known structures and functions have not been shown or described in detail to avoid unnecessarily obscuring the description of embodiments of the present technology. Although steps of methods may be presented herein in a particular order, in alternative embodiments, the steps may have another suitable order. Similarly, certain aspects of the present technology disclosed in the context of particular embodiments can be combined or eliminated in other embodiments. Furthermore, while advantages associated with certain embodiments may have been disclosed in the context of those embodiments, other embodiments can also exhibit such advantages, and not all embodiments need necessarily exhibit such advantages or other advantages disclosed herein to fall within the scope of the present technology.

Certain aspects of the present technology may take the form of computer-executable instructions, including routines executed by a controller or other data processor. In some embodiments, a controller or other data processor is specifically programmed, configured, or constructed to perform one or more of these computer-executable instructions. Furthermore, some aspects of the present technology may take the form of data (e.g., non-transitory data) stored or distributed on computer-readable media, including magnetic or optically readable or removable computer discs as well as media distributed electronically over networks. Accordingly, data structures and transmissions of data particular to aspects of the present technology are encompassed within the scope of the present technology. The present technology also encompasses methods of both programming computer-readable media to perform particular steps and executing the steps.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like are used throughout this disclosure to mean including at least the recited feature(s) such that any greater number of the same feature(s) and/or one or more additional types of features are not precluded. Directional terms, such as "upper," "lower," "front," "back," "vertical," and "horizontal," may be used herein to express and clarify the relationship between various elements. It should be understood that such terms do not denote absolute orientation. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

We claim:

1. A waterjet system, comprising:
   a carriage;
   a motion assembly configured to move the carriage in a first horizontal direction relative to a workpiece and a second horizontal direction relative to the workpiece, wherein the second horizontal direction is not parallel to the first horizontal direction;
   a cutting head carried by the carriage, wherein the cutting head is configured to direct a jet toward the workpiece while the motion assembly moves the carriage horizontally relative to the workpiece; and
   a kinematic chain through which the cutting head is operably connected to the carriage,
   wherein the kinematic chain includes—
     a first joint rotatably adjustable about a first axis,
     a second joint rotatably adjustable about a second axis different than the first axis,
     a third joint rotatably adjustable about a third axis different than the first and second axes, wherein the first, second, and third axes are not parallel to each other, and
     a fourth joint linearly adjustable to move the cutting head vertically relative to the carriage, and
   wherein—
     the first joint is in series between the cutting head and the second joint,
     the second joint is in series between the first joint and the third joint,
     the third joint is in series between the second joint and the carriage, and
     the fourth joint is in series between the third joint and the motion assembly.

2. The waterjet system of claim 1 wherein the third axis is perpendicular to the second axis.

3. The waterjet system of claim 1 wherein:
   the third joint is rotatably adjustable about the third axis to move between a first state and a second state;
   the second axis is vertical when the third joint is in the first state; and
   the second axis is not vertical when the third joint is in the second state.

4. The waterjet system of claim 1 wherein the third axis is horizontal.

5. The waterjet system of claim 1 wherein the third joint is a step joint.

6. The waterjet system of claim 1 wherein the third joint is configured to be adjusted manually.

7. The waterjet system of claim 1 wherein the third joint is configured to be adjusted automatically.

8. The waterjet system of claim 1 wherein:
   the first joint is rotatably adjustable about the first axis within a first range of motion;
   the second joint is rotatably adjustable about the second axis within a second range of motion greater than the first range of motion; and
   the third joint is rotatably adjustable about the third axis within a third range of motion less than the first range of motion.

9. The waterjet system of claim 8 wherein the third range of motion is less than or equal to 30 degrees.

10. The waterjet system of claim 8 wherein the third range of motion is less than or equal to 90 degrees.

* * * * *